United States Patent
Mischer et al.

(10) Patent No.: US 9,387,779 B2
(45) Date of Patent: Jul. 12, 2016

(54) SEAT TRACK ASSEMBLY HAVING SELECTABLE END STOP POSITIONS

(71) Applicant: Lear Corporation, Southfield, MI (US)

(72) Inventors: Hans-Peter Mischer, Bad Meinberg (DE); Reinhard Nolkensmeier, Delbrueck (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/431,120

(22) PCT Filed: Oct. 25, 2012

(86) PCT No.: PCT/US2012/061841
§ 371 (c)(1),
(2) Date: Mar. 25, 2015

(87) PCT Pub. No.: WO2014/065798
PCT Pub. Date: May 1, 2014

(65) Prior Publication Data
US 2015/0239368 A1    Aug. 27, 2015

(51) Int. Cl.
*F16M 13/00* (2006.01)
*B60N 2/07* (2006.01)

(52) U.S. Cl.
CPC ............ *B60N 2/0727* (2013.01); *B60N 2/0705* (2013.01); *B60N 2/0715* (2013.01); *B60N 2/0722* (2013.01)

(58) Field of Classification Search
CPC ... B60N 2/0727; B60N 2/0715; B60N 2/0705
USPC ......... 248/424, 429; 296/65.01, 65.11, 65.13; 297/344.11
See application file for complete search history.

(56) References Cited

U.S. PATENT DOCUMENTS

| | | | |
|---|---|---|---|
| 5,222,814 A | 6/1993 | Boelryk | |
| 5,820,216 A | 10/1998 | Feuillet | |
| 6,616,233 B1 | 9/2003 | Debus et al. | |
| 6,715,833 B2 | 4/2004 | Ito | |
| 7,000,880 B2 * | 2/2006 | Jaudouin | B60N 2/08 248/429 |
| 7,090,188 B2 | 8/2006 | Severini et al. | |
| 7,300,109 B2 | 11/2007 | Hofmann et al. | |
| 7,753,429 B2 | 7/2010 | Villeminey | |

(Continued)

FOREIGN PATENT DOCUMENTS

| | | |
|---|---|---|
| DE | 10039511 A1 | 2/2002 |
| DE | 202005019749 U1 | 2/2006 |
| DE | 202009002972 U1 | 7/2009 |
| DE | 102008012888 A1 | 9/2009 |

(Continued)

OTHER PUBLICATIONS

German Office Action, Application No. DE 10 2012 201 584.1, dated Oct. 5, 2012.

(Continued)

*Primary Examiner* — Todd M Epps
(74) *Attorney, Agent, or Firm* — MacMillan, Sobanski & Todd, LLC

(57) ABSTRACT

A seat track assembly includes a moveable rail configured to support a seat and a stationary rail configured to be mounted to a floor structure. The moveable rail is selectively positioned relative to the stationary rail is a plurality of use positions. The moveable and stationary rails include intermediate stop tabs that permit selective adjustment of the overall travel length of the moveable rail relative to the stationary rail.

15 Claims, 3 Drawing Sheets

(56) References Cited

U.S. PATENT DOCUMENTS

| | | |
|---|---|---|
| 7,815,159 B2 | 10/2010 | Moriyama et al. |
| 7,918,507 B2 | 4/2011 | Schmale |
| 7,993,060 B2 | 8/2011 | Kojima et al. |
| 8,191,850 B2 * | 6/2012 | Wetzig ................ B60N 2/0727 248/429 |
| 2009/0236488 A1 | 9/2009 | Koga et al. |
| 2010/0207419 A1 * | 8/2010 | Kojima ................ B60N 2/0727 296/65.13 |
| 2011/0101194 A1 | 5/2011 | Wetzig et al. |

FOREIGN PATENT DOCUMENTS

| | | |
|---|---|---|
| EP | 0094438 A1 | 11/1983 |
| EP | 2196354 A1 | 6/2010 |
| FR | 2852896 A1 | 10/2004 |
| WO | 2009109316 A1 | 9/2009 |

OTHER PUBLICATIONS

PCT International Search Report and Written Opinion, Application No. PCT/US12/61841, dated Jan. 25, 2013.

* cited by examiner

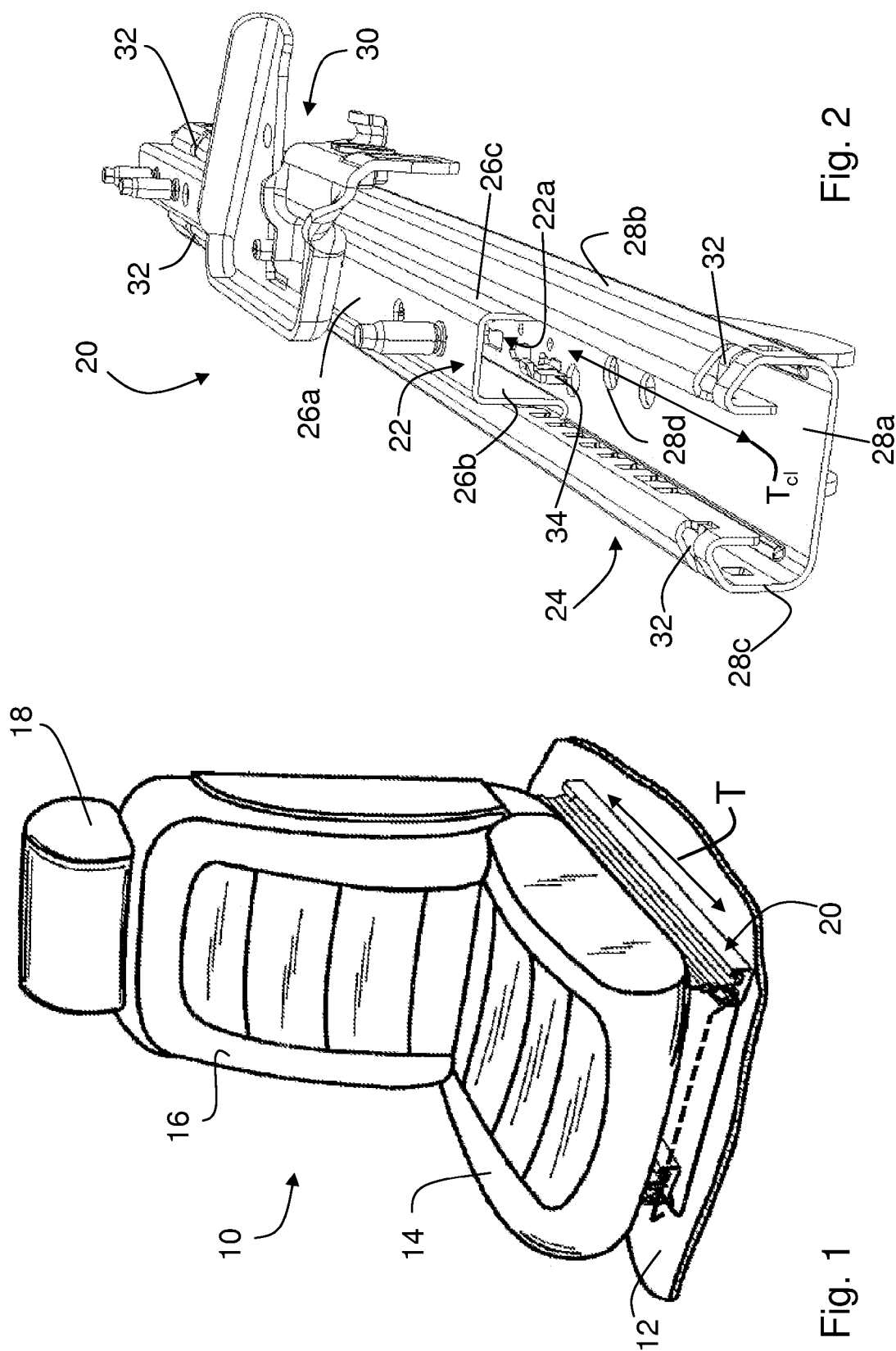

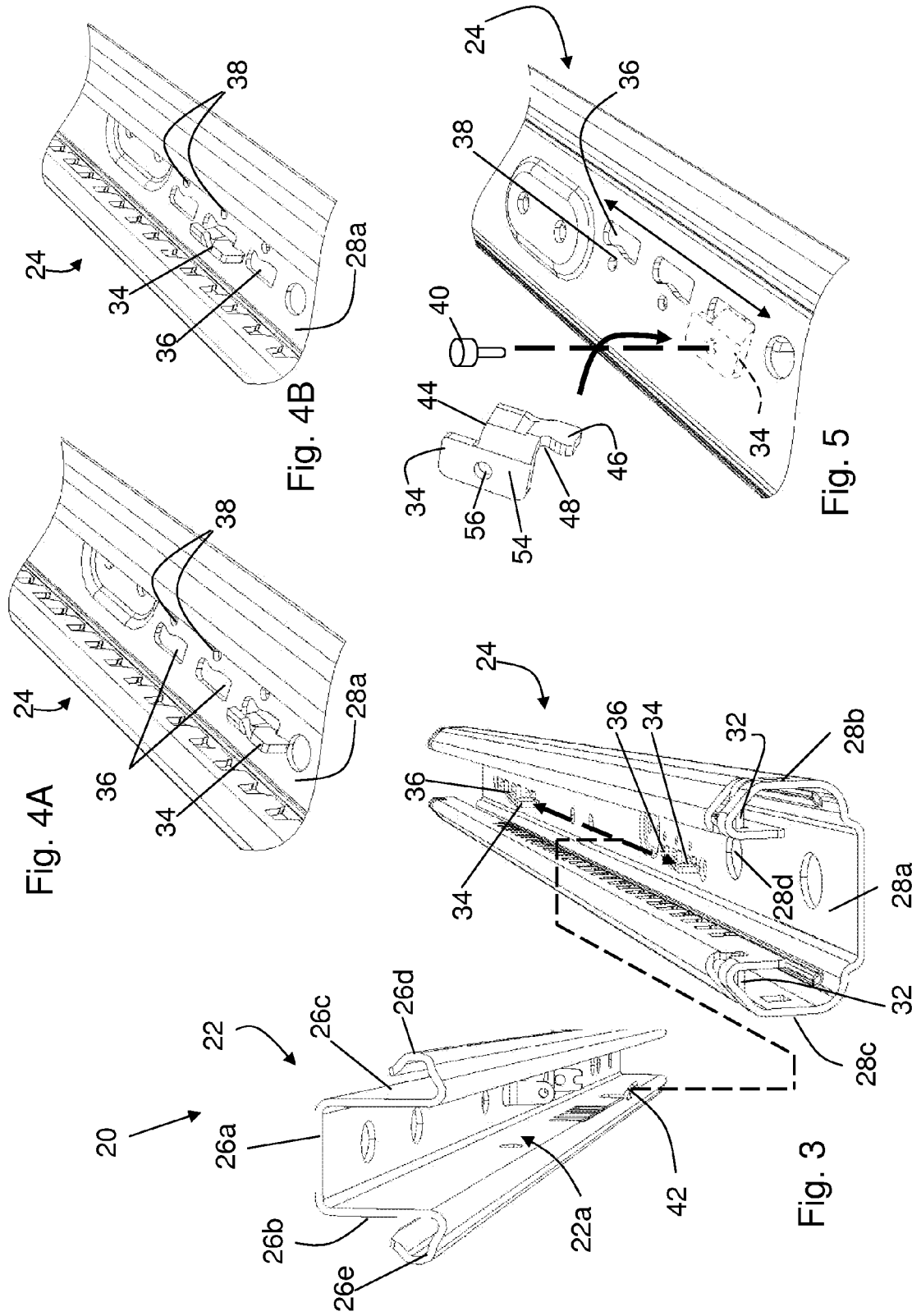

SEAT TRACK ASSEMBLY HAVING SELECTABLE END STOP POSITIONS

BACKGROUND OF THE INVENTION

This invention relates in general to seat track assemblies for adjusting the position of a seat relative to a support structure, such as a vehicle. In particular, this invention relates to an improved structure for such a seat track assembly having end stops that are relatively simple and inexpensive to manufacture and install.

Many support structures are provided with seats for supporting one or more occupants therein. For example, most vehicles, such as cars and trucks, are provided with seats for supporting the occupants within a passenger compartment. In many instances, the seats are mounted on the vehicle by two relatively moveable mounting structures. The two relatively moveable mounting structures allow the seat to be moved relative to the vehicle for positioning the occupant within comfortable reach of controls provided within the passenger compartment and otherwise increasing seating comfort of the occupant. Each seat is usually supported for movement in first and second directions relative to the vehicle, typically referred to as fore and aft movement of the seat relative to the vehicle.

Frequently, the relatively moveable mounting structures are embodied as elongated rails, one of which is secured to a floor or other support structure provided within the vehicle and the other of which is secured to a bottom surface or other support structure provided on the seat. The two rails cooperate to form a seat track assembly, and two seat track assemblies are typically provided for each seat. In most instances, each of the seat track assemblies has one or more bearings, bushings, or other friction reducing elements provided between the associated rails to minimize the amount of force that is needed to effect the fore and aft movement of the seat relative to the vehicle.

Most seat track assemblies also include end stops that limit the amount of relative movement that can occur between the two relatively moveable rails. Typically, first and second stops are provided on one of the rails of the seat track assembly, and a protrusion is provided on the other of the rails of the seat track assembly that extends between the two end stops. When the two rails have been moved in a fore direction relative to one another to a fore limit position, the protrusion engages one of the end stops to prevent further relative movement in the fore direction. Similarly, when the two rails have been moved in an aft direction relative to one another to an aft limit position, the protrusion engages the other of the end stops to prevent further relative movement in the aft direction. Thus, the end stops prevent the rails from being overextended in either of the fore and aft directions relative to the vehicle.

In some instances, the end stops are formed integrally with the rails of the seat track assembly. Although efficient to manufacture and effective in operation, seat track assemblies having such integrally formed end stops are not readily adapted for use in vehicles of differing sizes and shapes. As a result, a plurality of different track assemblies, each having end stops formed in different locations on the rails, are usually required to be manufactured. In other instances, the end stops are initially formed separately from the rails of the seat track assembly, but are subsequently positioned at desired locations on the rails and secured thereto. Although this avoids the need for a plurality of different track assemblies to be manufactured as described above, known end stops that are separately formed from the rails and subsequently secured thereto have been found to be relatively complicated and expensive to manufacture and install on the rails. Thus, it would be desirable to provide an improved end stop for a seat track assembly that is relatively simple and inexpensive to manufacture and install.

SUMMARY OF THE INVENTION

This invention relates to longitudinally adjustable seat tracks having end stops that determine the ends of travel of a moveable rail relative to a stationary rail.

In a first aspect, a seat track assembly includes a moveable rail and a stationary rail. The moveable rail is supported on the stationary rail for selective movement relative thereto. The stationary rail has at least one intermediate stop tab insertion aperture and an associated attachment aperture formed therethrough. An intermediate stop tab is configured to be inserted through the insertion aperture to form an intermediate end stop position, wherein the intermediate end stop tab interferes with movement of the moveable rail relative to the stationary rail. The intermediate stop tab may be one or more stop tabs that are selectively inserted into a travel path of the moveable rail and attachable to the stationary rail. One of the moveable and stationary rails may also include a structure that engages the intermediate stop tabs to limit the travel length of the moveable rail relative to the stationary rail.

In a second aspect, a seat track assembly includes a first rail and a second rail. The first rail defines a longitudinal track axis and has an extending structure selectively deployable along the track axis. The second rail supports the first rail for telescopic relative movement along the longitudinal track axis. The extending structure of the first rail is configured to selectively engage a portion of the second rail to limit an overall travel length of the first rail relative to the second rail. The extending structure is located between the first and second rails and engages one or more intermediate stop tabs to limit the travel length of the first rail relative to the second rail.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a perspective view of a seat including a seat track assembly in accordance with this invention.

FIG. 2 is an enlarged perspective end view of the seat track assembly illustrated in FIG. 1.

FIG. 3 is an exploded, perspective view of the seat track assembly illustrated in FIG. 2.

FIG. 4A is a further enlarged perspective view of a portion of a first rail and a stop tab of the seat track assembly illustrated in FIGS. 2 and 3 showing the stop tab is located in a first position relative to the first rail.

FIG. 4B is a perspective view similar to FIG. 4A showing the stop tab located in a second position relative to the first rail.

FIG. 5 is a perspective view of the bottom side of the first rail showing the manner in which the stop tab is secured thereto.

DETAILED DESCRIPTION OF THE PREFERRED EMBODIMENT

Figure 6C:
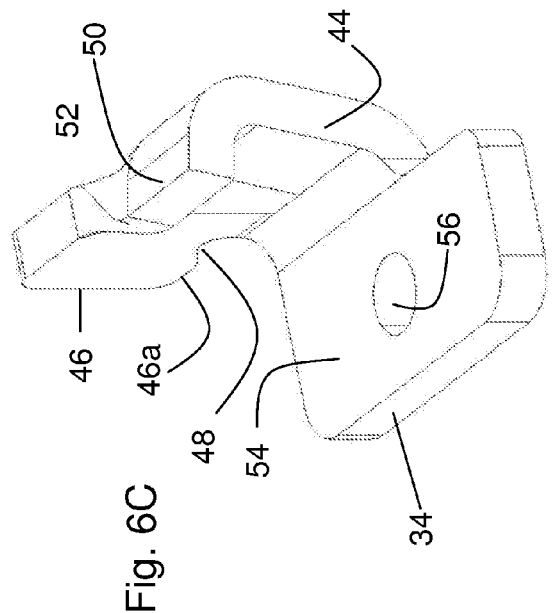
FIG. 6C is an enlarged perspective view of a first end of the stop tab illustrated in FIGS. 6A and 6B.

Referring now to the drawings, there is illustrated in FIG. 1 a seat, indicated generally at 10, in accordance with this invention. The illustrated seat 10 is a vehicular seat that is mounted on a floor 12 or other support surface of a vehicle. However, this invention is suitable for use in any environment to provide selective relative movement of the seat 10 relative to any type of support surface. The illustrated seat includes a seat bottom 14 and a seat back 16, although such is not required. The seat back 16 may be may be moveable (such as pivotable) relative to the seat bottom 14, or the seat back may be fixed in position relative to the seat bottom 14. The illustrated seat back 16 has a headrest 18 attached thereto that is located opposite to the seat bottom 14. The headrest 18 (which is optional) may be formed either as a separate component or integrated into the seat back 16.

A seat track assembly, indicated generally at 20, is provided between the seat bottom 14 and the floor 12 of the vehicle. As will be explained in detail below, the seat track assembly 20 allows selective movement of the seat 10 relative to the floor 12 in first and second longitudinal directions defined by a track axis T, as shown in FIG. 1. These first and second longitudinal directions will be described herein as fore and aft directions, as commonly designated in the vehicle seat industry. As will be explained in detail below, the seat track assembly 20 is structured and configured to allow the seat 10 to be positioned relative to the floor 12 of the vehicle at any one of a plurality of positions located between a fore limit position and an aft limit position.

The structure of the seat track assembly 20 is illustrated in detail in FIGS. 2 and 3. As shown therein, the seat track assembly 20 includes a first rail 22 and a second rail 24 that are telescopically engaged for relative movement therebetween. In the illustrated embodiment, the first rail 22 is attached to the seat bottom 14 for movement therewith, while the second rail 24 is attached to the floor 12 of the vehicle. Thus, the first rail 22 supports the seat 10 for movement relative to the second rail 24 and the vehicle. As described herein, the first rail 22 will be referred to as the moveable rail, while the second rail 24 will be referred to as the stationary rail. However, it will be appreciated that the elements of this invention that relate to the limiting of the relative movement of the moveable and stationary rails may be provided on either of the rails as desired.

The moveable rail 22 includes a generally U-shaped center portion that includes a seat mounting wall 26a connecting two spaced-apart wall sections 26b and 26c. The walls 26a, 26b, and 26c of the U-shaped center portion of the moveable rail 22 define an interior cavity 22a. Slide arms 26d and 26e extend respectively outwardly from the spaced-apart wall sections 26b and 26c. The stationary rail 24 includes a track mounting wall 28a and slide support arms 28b and 28c that extend outwardly from the track mounting wall 28a. The track mounting wall 28a includes one or more mounting structures 28d that facilitate the attachment of the stationary rail 24 to the floor 12. The mounting structures 28d may be embodied as holes formed through the track mounting wall 28a, as shown in FIGS. 2 and 3, to permit a fastener to secure the track to the floor 12. Alternatively, the mounting structures 28d may be embodied as fasteners that extend through the track mounting wall 28a or any other desired structure. The slide arms 26d and 26e and the slide support arms 28b and 28c may be configured other than shown and may extend inwardly within the interior cavity 22a of the U-shaped center portion of the moveable rail 22. The slide arms 26d and 26e and the slide support arms 28b and 28c are configured to support the moveable and stationary rails 22 and 24 for relative longitudinal movement along the track axis T when telescopically engaged together. The slide arms 26d and 26e and the slide support arms 28b and 28c may include friction reducing elements, such as ball bearings, friction reducing polymer materials or coatings, opposed pole magnets, or any structure that facilitates movement of the moveable rail 22 relative to the stationary rail 24.

A latch assembly 30 is configured to be moved between a released position, which permits relative movement of the moveable and stationary rails 22 and 24, and a latched position, which prevents relative movement of the moveable and stationary rails 22 and 24. The latch assembly 30 may be embodied as any latch structure, such as the latch assembly described in U.S. patent application Ser. No. 13/219,989, filed Aug. 29, 2011, the disclosure of which is incorporated herein by reference. The latch assembly 30 may include articulable fingers that selectively extend into and out of cooperating windows and spaces formed into the walls 26b and 26c and the slide arms 28b and 28c to correspondingly prevent or permit relative movement to occur between the moveable rail 22 and the stationary rail 24. The latch assembly 30 may be attached to the moveable rail 22 either within the interior cavity 22a of the U-shaped center portion 22 or anywhere suitable on the exterior of the moveable rail 22. Alternatively, the latch assembly 30 may be carried by the stationary rail 24, and the moveable rail 22 may include the appropriate cooperating engagement members (i.e. windows or teeth).

The illustrated stationary rail 24 further includes one or more fixed end stops 32. In the illustrated embodiment, two of such fixed end stops 32 are integrally formed on each end of each of the slide support arms 28b and 28c of the stationary rail 24. These fixed end stops 32 determine the extreme ends of travel of the moveable rail 22 relative to the stationary rail 24. The illustrated fixed end stops 32 are stamped arms that extend into the travel path of the moveable rail 22 and contact the slide arms 26d and 26e to prevent further fore and aft movement of the moveable rail 22 relative to the stationary rail 24. The fixed end stops 32 may alternatively be formed separately from the stationary rail 22 (such as screws, bolts, end caps, and the like) and secured thereto so as to limit the axial movement of the moveable rail 22 relative to the stationary rail 24.

The seat track assembly 20 also includes at least one intermediate stop tab 34 that is provided on the track mounting wall 28a of the stationary rail 24. As shown in FIG. 3, the illustrated seat track assembly 20 includes two intermediate stop tabs 34 that are positioned near the longitudinal ends of the stationary rail 24. The intermediate stop tabs 34 define two ends of travel of the moveable rail 22 relative to the stationary rail 24 that are shorter than the overall travel length defined by the fixed end stops 32. As best shown in FIG. 3, each of the intermediate stop tabs 34 is assembled to the stationary rail 24 through an insertion aperture 36 that is formed through the track mounting wall 28a of the stationary rail 24. The illustrated insertion apertures 36 are offset to one side of the stationary rail 24 and positioned generally along a centerline $T_{CL}$ of the longitudinal axis T. Preferably, a plurality of such insertion apertures 36 (three in the illustrated embodiment) are formed through the track mounting wall 28a for each of the intermediate stop tabs 34 to provide a great amount of flexibility in determining the two ends of travel of the moveable rail 22 relative to the stationary rail 24.

The plurality of insertion apertures 36 can be positioned in any suitable orientation along the stationary rail 24. In the illustrated embodiment, two groups of the insertion apertures 36 are each formed in a single-file, longitudinally-oriented row in discrete groups near the respective ends of the stationary rail 24. It should be understood that the insertion apertures 36 may be oriented or grouped differently from the illustrated embodiments, if desired. The insertion apertures 36 may be staggered along either side of the stationary rail centerline in order to increase the combinations available to vary travel distances of the moveable rail 22.

Each of the illustrated insertion apertures 36 is formed adjacent to a mounting aperture 38. As shown in FIG. 3, the mounting apertures 36 are generally aligned along the stationary rail centerline $T_{CL}$, although such is not required. The mounting apertures 38 facilitate fixing the intermediate stop tabs 34 to the stationary rail 24 by respective fasteners 40. In the illustrated embodiment, each of the fasteners 40 is a rivet. It should be understood, however, that the fasteners 40 may be embodied as any retaining structure or combination of structures, such as blind rivets, upset rivets, screws, bolts, or other fasteners. Alternatively, one of the stationary rail 24 and the intermediate stop tab 36 may be provided with a projection for attachment by electric resistance welding. Regardless, as shown in FIGS. 4A and 4B, the intermediate stop tabs 34 may be inserted into one of a plurality of the insertion apertures 36, which are selected to establish the desired end position of the moveable rail 22 relative to the stationary rail 24.

The intermediate stop tabs 34 are configured to be selectively assembled to the stationary rail 24 to form an intermediate end stop position. Each of the intermediate stop tabs 34 functions to limit the overall travel length of the moveable rail 22 relative to the stationary rail 24. This is contrasted with the latch assembly 30, which functions to selectively prevent movement of the moveable rail 22 relative to the stationary rail 24 within the travel length permitted by the intermediate stop tabs 34 (or, alternatively, the fixed end stops 32 if either or both of the intermediate stop tabs 34 are not used).

The moveable rail 22 may include a stop arm 42 (see FIG. 3) that extends into the interior cavity 22a. The illustrated stop arm 42 is a tab that is formed from a portion of the wall section 26b of the moveable rail 22 and is bent or otherwise deformed to extend inwardly into the interior cavity 22a. The stop arm 42 is positioned to engage the intermediate end stops 34 to limit the telescoping longitudinal travel in the fore and aft directions of the moveable rail 22 relative to the stationary rail 24. The stop arm 42 may alternatively be formed separately from the moveable rail 22, such as a fastener cantilevered into the interior cavity 22a, a rod extending across the interior cavity 22a and between the side walls 26b and 26c, or a stop bracket that can be attached to the walls of the U-shaped center portions of the moveable rail 22. Additionally, a plurality of stop arms 42 (not shown) may be provided on one or both spaced-apart side walls 26b and 26c to provide additional travel limits between the moveable rail 22 and the stationary rail 24. These stop arms 42 may interact with selected staggered intermediate stop tabs 34 to increase the available adjustment capability of the seat track assembly 20.

Figure 6D:
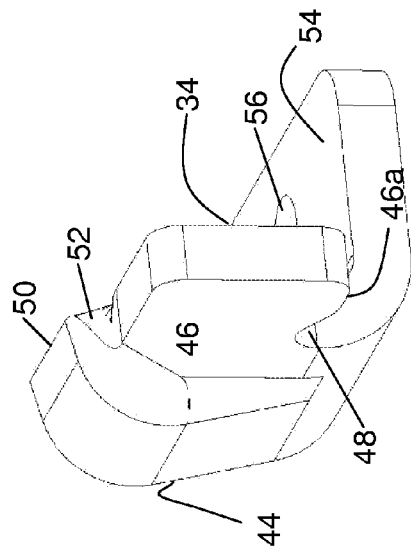
FIG. 6D is an enlarged perspective view of a second end of the stop tab illustrated in FIGS. 6A through 6C.
Figure 6A:
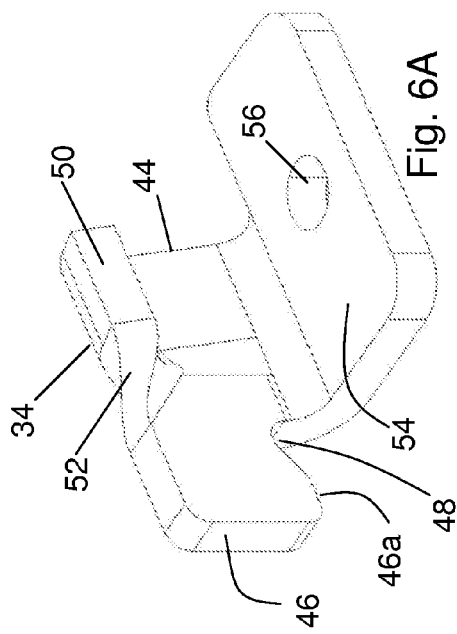
FIG. 6A is an enlarged perspective view of a front side of the stop tab illustrated in FIGS. 2 through 5.
Figure 6B:
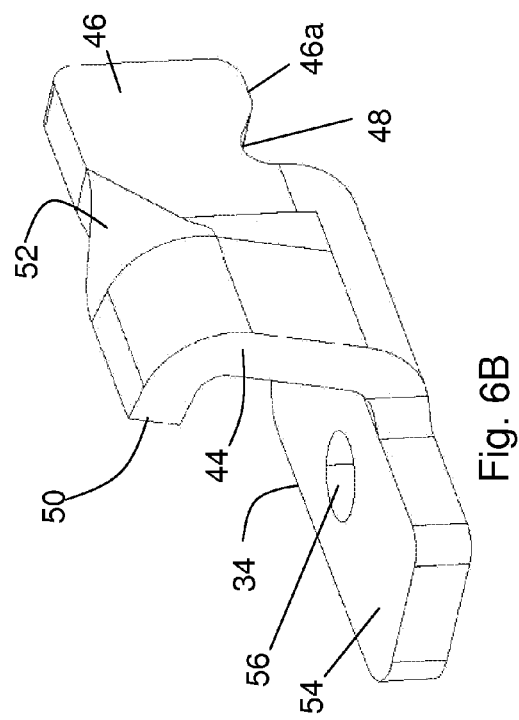
FIG. 6B is an enlarged perspective view of a rear side of the stop tab illustrated in FIG. 6A.

The structure of one of the intermediate stop tabs 34 is illustrated in FIGS. 6A through 6D. As shown therein, the intermediate stop tab 34 includes an abutment end 44 that makes contact with the stop arm 42 of the moveable rail 22 to limit travel. A reaction anvil 46 is cantilevered from the intermediate stop tab 34 to provide a backstop or load reaction point against the track mounting wall 28a as an increasing load is applied from the moveable rail 22 to the stop arm 42. The reaction anvil 46 may include an installation notch 48 to facilitate installation of the intermediate stop tab 34 in the insertion aperture 36. As shown in FIGS. 4A, 4B, and 5, the distance from the abutment end 44 to the reaction anvil 46 is larger than the length of the insertion aperture 36. The installation notch 48 may permit the lower face 46a of the reaction anvil 46 to abut, and optionally press firmly against, the surface of the track mounting wall 28a of the stationary rail 24. This preloading feature assists in distributing the loads applied by the stop arm 42 of the moveable rail 22 against the abutment end 44, especially during impact-magnitude load events.

The abutment end 44 may also include a reinforcement ridge 50 that provides increased rigidity of the abutment end 44 against deflection under loads imparted from the moveable rail 22. The reinforcement ridge 50 may also be interconnected with the reaction anvil 46 by a transfer section 52, though such is not required. The transfer section 52 is illustrated in one embodiment as a twisted surface that smoothly transitions the surface of the reinforcement ridge 50 to the top surface of the reaction anvil. The intermediate stop tab 34 further includes a mounting pad 54 that includes a mounting aperture 56 that cooperates with the mounting aperture 36 formed into the track mounting wall 28a to permit attachment therebetween. As previously described, only one of the mounting apertures 38 and 56 may provided and configured as a projection for resistance welding applications.

Although not required, the intermediate stop tabs 24 may be configured to be either the same or as mirror images of each other. When configured as mirror images, the abutment ends 44 of the spaced-apart intermediate stop tabs 34 may be arranged to face each other such that the stop arm 42 travels in the space therebetween, as shown in FIG. 3. Additionally, at least one of the abutment end 44 and the stop arm 42 may be coated with a sound absorbing material, such as a rubber cap or sleeve, to dampen contact noise.

It should be understood that the various configurations of intermediate stop tabs 34, as well as the various extending structures, described herein may be provided on either the moveable or stationary rails 22 and 24 as desired. For example, the intermediate stop bracket 36 may be attached to the stationary rail 24 and the seat mounting wall 26a of the moveable rail 22 may include the intermediate stop tabs 34.

FIG. 5 illustrates the manner in which the intermediate stop tab 34 can be inserted into the desired insertion aperture 36 of the stationary rail 24 and secured thereto. In one installation method, after the desired insertion aperture 36 has been determined, the intermediate stop tab 34 is tipped relative to the back side of the stationary rail 24 such that the reaction anvil 46 initially enters the insertion aperture 36. The installation notch 48 may abut an edge of the insertion aperture 36 to permit the reinforcement ridge 50 and the abutment end 44 to pass through the insertion aperture 36 such that the mounting pad 54 locates against the stationary rail 22. The intermediate stop tab 34 may be moved, if necessary, so as to align the mounting holes 38 and 56. In one embodiment, the fastener 40 is attached by a suitable process to firmly connect the intermediate stop tab 34 to the stationary rail 24.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A seat track assembly comprising:
a stationary rail having an insertion aperture and a mounting aperture formed therethrough;
a moveable rail supported on the stationary rail for movement relative thereto; and
an intermediate stop tab secured to one of the stationary rail and the movable rail so as to limit the movement of the moveable rail relative to the stationary rail, the intermediate stop tab including an abutment end, a reaction anvil, and a mounting pad having a mounting aperture that aligns with the stationary rail mounting aperture.

2. The seat track assembly of claim 1 wherein the stationary rail includes a track mounting wall, and the insertion aperture and mounting aperture are a plurality of insertion apertures and mounting apertures that are formed into the track mounting wall, the corresponding mounting apertures being generally aligned with a longitudinal track axis defining a track centerline, the plurality of insertion apertures are offset from the track centerline, and the moveable rail includes an extending structure configured to engage the intermediate stop tab to limit an overall travel length of the moveable rail relative to the stationary rail.

3. The seat track assembly of claim 2 wherein the extending structure is a stop arm that is configured to be bent from a portion of the moveable rail.

4. The seat track assembly of claim 3 wherein the stop arm is one of a plurality of stop arms selectively bent into the travel path of the moveable rail.

5. The seat track assembly of claim 3 wherein the stationary rail includes at least one fixed end stop positioned on an end thereof, at least one of the fixed end stops positioned to limit a furthest length of travel of the moveable rail relative to the stationary rail.

6. The seat track assembly of claim 1 wherein the reaction anvil is cantilevered from the intermediate stop tab and spaced opposite the abutment end.

7. The seat track assembly of claim 6 wherein the reaction anvil further includes a lower face that abuts the track mounting wall of the stationary rail.

8. The seat track assembly of claim 7 wherein the lower face applies a preload to the track mounting wall when the intermediate stop tab is fastened to the stationary rail.

9. The seat track assembly of claim 8 wherein the length of the intermediate stop tab from the abutment end to the reaction anvil is longer than the length of the insertion aperture.

10. The seat track assembly of claim 9 wherein the reaction anvil includes an installation notch that cooperates with the insertion aperture to permit installation of the intermediate stop tab through the insertion aperture.

11. The seat track assembly of claim 1 wherein the intermediate stop tab includes a reinforcement ridge that provides increased rigidity of the abutment end against deflection.

12. The seat track assembly of claim 11 wherein the intermediate stop tab includes a transfer section that connects the reinforcement ridge to the reaction anvil.

13. The seat track assembly of claim 12 wherein the moveable rail defines an interior cavity and includes a stop arm that extends into the interior cavity and contacts the intermediate stop tab at an end of travel of the moveable rail relative to the stationary rail.

14. The seat track assembly of claim 12 wherein the insertion aperture is a plurality of insertion apertures spaced along a stationary rail centerline.

15. The seat track assembly of claim 14 wherein the insertion aperture is a first plurality of insertion and a second plurality of insertion apertures, the first plurality of insertion apertures being located at a first end of the stationary rail and the second plurality of insertion apertures being located at a second end of the stationary rail that is opposite the first end.

* * * * *